United States Patent
Liu et al.

(10) Patent No.: US 7,738,406 B2
(45) Date of Patent: Jun. 15, 2010

(54) MODELS FOR ROUTING TREE SELECTION IN PEER-TO-PEER COMMUNICATIONS

(75) Inventors: Shao Liu, Redmond, WA (US); Sudipta Sengupta, Redmond, WA (US); Mung Chiang, Bellevue, WA (US); Jin Li, Sammamish, WA (US); Philip Andrew Chou, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 62 days.

(21) Appl. No.: 12/247,431

(22) Filed: Oct. 8, 2008

(65) Prior Publication Data

US 2010/0085979 A1 Apr. 8, 2010

(51) Int. Cl.
*H04L 12/28* (2006.01)
(52) U.S. Cl. ........................ 370/256; 370/408
(58) Field of Classification Search ......... 370/252–256, 370/400–408
See application file for complete search history.

(56) References Cited

U.S. PATENT DOCUMENTS

| 7,636,789 | B2 * | 12/2009 | Li et al. ...................... 709/242 |
| 2002/0161898 | A1 | 10/2002 | Hartop et al. |
| 2003/0185166 | A1 * | 10/2003 | Belcea ....................... 370/321 |
| 2004/0236863 | A1 | 11/2004 | Shen et al. |
| 2006/0007947 | A1 | 1/2006 | Li et al. |
| 2006/0187860 | A1 | 8/2006 | Li |
| 2007/0064405 | A1 * | 3/2007 | Chen ......................... 361/810 |
| 2007/0094405 | A1 | 4/2007 | Zhang |
| 2007/0280255 | A1 | 12/2007 | Tsang et al. |

FOREIGN PATENT DOCUMENTS

WO 2008043092 A1 10/2008

OTHER PUBLICATIONS

Hefeeda, et al.,"Promise: Peer-to-Peer Media Streaming Using CollectCast", Retrieved at <<http://dslab.csie.ncu.edu.tw/94html/paper/pdf/PROMISE:%20Peer-to-Peer%20Media%20Streaming%20Using%20CollectCast.pdf>>, MM'03, Nov. 2-8, 2003, ACM, Berkeley, California, USA, pp. 10.

(Continued)

*Primary Examiner*—Phuc Tran

(57) ABSTRACT

Peer-to-peer communications sessions involve the transmission of one or more data streams from a source to a set of receivers that may redistribute portions of the data stream via a set of routing trees. Achieving a comparatively high, sustainable data rate throughput of the data stream(s) may be difficult due to the large number of available routing trees, as well as pertinent variations in the nature of the communications session (e.g., upload communications caps, network link caps, the presence or absence of helpers, and the full or partial interconnectedness of the network.) The selection of routing trees may be facilitated through the representation of the node set according to a linear programming model, such as a primal model or a linear programming dual model, and iterative processes for applying such models and identifying low-cost routing trees during an iteration.

20 Claims, 8 Drawing Sheets

OTHER PUBLICATIONS

Xiang, et al., "Peer-to-Peer Based Multimedia Distribution Service", Retrieved at <<http://nsl.cs.surrey.sfu.ca/nrg/papers/XZZZ04.pdf>>, IEEE Transactions on Multimedia, vol. 6, No. 2, Apr. 2004, pp. 343-355.

Kwon, et al., "Distributed Multimedia Streaming over Peer-to-Peer Networks", Retrieved at <<http://dcslab.snu.ac.kr/paper/europar.pdf>>, 2003, pp. 1-8.

Cheng, et al., "Adaptive peer-to-peer streaming with MutualCast". Retrieved at <<http://www.zju.edu.cn/jzus/2006/A0605/A060509.pdf>>, Journal of Zhejiang University Science A, 2006, pp. 737-748.

Dai, et al., "Maximizing Throughput in Layered Peer-to-peer Streaming", Retrieved at <<http://vanets.vuse.vanderbilt.edu/~dai/papers/icc07-dai-maximizing.pdf>>, pp. 1-6.

Padmanabhan, et al., "Resilient Peer-to-Peer Streaming", Retrieved at <<http://research.microsoft.com/~helenw/papers/icnp2003.pdf>>, 2003, pp. 12.

Charikar, et al., "Approximation Algorithms for Directed Steiner Problems", Retrieved at <<http://dclab.cs.nthu.edu.tw/~kwc/20030821/Approximation%20Algorithms%20for%20Directed%20Steiner%20Problems.pdf>>, on Sep. 30, 2008, pp. 192-200.

Feige, et al., "A Threshold of In n for Approximating Set Cover", Retrieved at <<http://citeseer.ist.psu.edu/cache/papers/cs/15679/http:zSzzSzwww.wisdom.weizmann.ac.ilzSz~feigezSzApproxzSzsetcover.pdf/feige98threshold.pdf>>, Apr. 2, 1998, pp. 1-23.

Huang, et al.,"Can Internet Video-on-Demand be Profitable?", Retrieved at <<http://research.microsoft.com/~chengh/papers/profitableVoD.pdf>>, SIGCOMM'07, Aug. 27-31, 2007, Kyoto, Japan, ACM Publication, pp. 1-12.

Lau, et al., "Survivable Network Design with Degree or Order Constraints", Retrieved at <<http://www.andrew.cmu.edu/user/mohits/sndp.pdf>>, STOC'07, Jun. 11-13, 2007, San Diego, California, USA, ACM Publication, pp. 1-10.

Li, et al., "Mutualcast: An Efficient Mechanism for One-To-Many Content Distribution", Retrieved at <<http://msw3.stanford.edu/~ivmsjc/esetton/jc_apr27.pdf>>, ACM Sigcomm Asia'04, Apr. 10-12, 2004, Beijing, China, ACM Publication, 2004, pp. 10.

"Jupiter Research Tech.", "US Broadband Forecast, 2007 to 2012'—JupiterResearch Report—May 9, 2007", Retrieved at <<http://www.imnewswatch.com/archives/2007/05/us_broadband_fo.html?visitFrom=2>>, on May 5, 2008, pp. 1-5.

* cited by examiner

60 ⟶

$p_v \leftarrow \delta$
flow$(v) \leftarrow 0, \forall v \in V$
$Y \leftarrow 0$
while $\alpha(p) \triangleq \sum_{v \in V} C(v)p_v < 1$
    pick tree $t \in T$ with smallest $Q(t,p) \triangleq \sum_{v \in V} m_{v,t} p_v$
    $y \leftarrow \min_{v \in l_t} C(v)/m_{v,t}$
    assign rate $y$ to tree $t$
    flow$(v) \leftarrow$ flow$(v) + y m_{v,t}, \forall v \in t$
    $Y \leftarrow Y + y$
    $p_v \leftarrow p_v \left(1 + \varepsilon \frac{m_{v,t} y}{C(v)}\right), \forall v \in t$
    compute $\alpha(p)$ from updated $p$
end while
compute scaling factor $\mathcal{L} \leftarrow \max_{v \in V} \frac{\text{flow}(v)}{C(v)}$
output capacity $r^* \leftarrow Y / \mathcal{L}$

Pick $v^* \in \operatorname{argmin}_{v \in V} \hat{p}(v)$
    If $v^* = s$, construct $t^*: s \to v, \forall v \in R$.
    If $v^* \in R$, construct $t^*: s \to v^*, v^* \to v, \forall v \neq v^* \in R$.
    If $v^* \in H$, construct $t^*: s \to v^*, v^* \to v, \forall v \in R$.

Pick $v \in R$· with the smallest price.
$A = \{s, v\}, B = R - \{v\}$
$s \to v, m(s) = 1, m(v) = 0, \forall v \in R$
while $A \neq V$:
    $\tilde{A} = \{v \in A: m(v) < M(v)\}$
    Pick $v_a \in \tilde{A}$ with the smallest price
    $m' = \min(|B|, M(v_a) - m(v_a))$
    Find $m'$ smallest price nodes in $B$, denote the set by $D$
    $A = A \cup D, B = B - D$
end while

$m = \min(M_p, |R|)$ $p'(v) = \begin{cases} p(v), \forall v \in R \cup S, \\ p(v)\left(1 + \frac{1}{m-1}\right), \forall v \in H \end{cases}$ Pick $v \in R \cup H$ with smallest effective price $p'(v)$
$A = \{s, v\}$, $B = R \cup H - v$
$s \rightarrow v$, $m(s) = 1$, $m(v) = 0$, $\forall v \in R$
while $B \cap R \neq \emptyset$:
    $m = \min(m_p, |R \cap R|)$
    $p'(v) = p(v)\left(1 + \frac{1}{m-1}\right), \forall v \in H$
    $\bar{A} = \{v \in A : m(v) < M(v)\}$
    Pick $v_a \in \bar{A}$ with smallest effective price
    if $|B \cap R| \leq M(v_a) - m(v_a)$:
        $v_a \rightarrow v, \forall v \in (B \cap R)$
        $m(v_a) = m(v_a) + |B \cap R|$
        $A = A \cup (B \cap R)$
        $B = B - (B \cap R)$
    else
        $m' = M(v_a) - m(v_a)$
        $D$ = set of $m'$ smallest effective price nodes in $B$
        $A = A \cup D$
        $B = B - D$
        $v_a \rightarrow v, \forall v \in D$
        $m(v_a) = m(v_a) + m'$
    end if
end while
$\delta = 1$
while $\delta = 1$
    $\delta = 0$
    for each leaf helper $v_h \in A$
        $\delta = 1$
        $v_1$ = parent of $v_h$
        $v_2 = \mathrm{argmax}_{v \in A: m(v) > 0} p(v)$
        if $v_1 \neq v_2$
            pick one child of $v_2$ and move it to be $v_1$'s child
        end if
        $A = A - v_h$
        $m(v_2) = m(v_2) - 1$
        if $v_2 \in H$ and $m(v_2) > 0$
            while $m(v_2) > 0$
                $p'(v_2) = p(v_2)\left(1 + \frac{1}{m(v_2)-1}\right)$
                $v_3 = \mathrm{argmin}_{v \in A \cup R \cup S: m(v) < M(v)} p(v)$
                if $p'(v_2) > p(v_3)$
                      let $m'' = \min(M(v_3) - m(v_3), m(v_2))$
                      move $m''$ children of $v_2$ to $v_3$
                      $m(v_3) = m(v_3) + m''$
                      $m(v_2) = m(v_2) - m''$
                else
                    break
                end if
            end while
        end if
    end for
end while

```
Pick v ∈ B_s with the smallest price.
A = {s, v},   B = R − v, s → v
while B ∩ R ≠ ∅:
        let u* = argmin_{v∈A:B_v≠0} P(v)
        u* → v, ∀v ∈ B_{u*}
        A = A ∪ B_{u*}
        B = B − B_{u*}
end while
if A ∩ H = ∅
        [done]
end if
flag = 1
while flag = 1
        delete all leaf helpers from A
        flag = 0
        for each internal helper node h
                let C_h be the set of children of node h
                for each v ∈ C_h
                        let O_v be neighbor set of v
                        if there exists v: O_v ∩ R = ∅
                                skip to next h
                        else
                                pick r_h in O_v ∪ R with the smallest price
                                denote by t the current tree
                                t' = t
                                in t', r_v → v, h ↛ v
                                if Q(t', p) < Q(t, p)
                                        t = t'
                                        flag = 1
                                end if
                        end if
                end for
        end for
end while
```

$p_v \leftarrow \frac{\delta}{C(v)}$
flow$(v) \leftarrow 0, \forall v \in V$
phase $\leftarrow 0$
repeat
    for each $k = 1,2,\cdots,K$
        $r = r^k$
        while $r > 0$
            compute minimum cost tree $t \in T^k$ under prices $p_v$
            so as to minimize $\sum_{v \in V} m_{v,t} p_v$
            $u \leftarrow \min_{v \in V, m_{v,t} > 0} \frac{C(v)}{m_{v,t}}$
            $y_t = \min(r, u)$
            for each $v \in t$
                $p_v \leftarrow p_v \left(1 + \frac{em_{v,t} y_t}{C(v)}\right)$
                flow$(v) \leftarrow$ flow$(v) + m_{v,t} y_t$
            end for
            $r \leftarrow r - y_t$
        end while
    end for
    phase $\leftarrow$ phase $+ 1$
    $D \leftarrow \sum_{v \in V} C(v) p_v$
until $D \geq 1$
compute $\mathcal{L}(v) \leftarrow \max_{v \in V} \frac{\text{flow}(v)}{C(v)}$
compute scaling factor $\mathcal{L} \leftarrow \max_{v \in V} \text{scale}(v)$
output $\lambda = $ phase$/\mathcal{L}$

FIG. 10

MODELS FOR ROUTING TREE SELECTION IN PEER-TO-PEER COMMUNICATIONS

BACKGROUND

The peer-to-peer communications model involves a set of nodes (such as computers or devices) connected over a network that cooperate in the distribution of one or more data streams. This model differs from more conventional communications models by permitting a node that is receiving a portion of the data stream to redistribute it to other nodes, thereby reducing the communications strain on the source of the data stream and amplifying the availability and potential throughput of the source stream to other nodes.

A peer-to-peer communications session may be established over networks and among clients that have many properties relevant to the throughput of the network, such as the uploading and downloading capacity of the nodes; an uploading communications cap that limits the number of outbound connections that may be established by a node; and the full or partial interconnectedness of the nodes (i.e., whether any node is able to reach the full set of nodes or only a neighboring subset thereof.) The number of data streams generated and shared among the nodes may also be relevant; e.g., a single data stream may be shared by a single source and redistributed among the nodes (such as in an IP television scenario), or a plurality of data streams may be shared by multiple sources to be redistributed to the nodes (such as in a conferencing scenario.) Moreover, some nodes may cooperate as helpers by optionally participating in the session, such that the helper does not consume the data stream (and may be excluded from a portion of the data stream) but may be utilized for redistributing a portion of the data stream to other nodes. These and other properties of the network topology and capacity, the roles and capabilities of the nodes, and the nature of the data streams to be shared may affect the achievable throughput of the data streams in the peer-to-peer communications session.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In view of the properties of a given peer-to-peer communications session, including the topology and capacity of the network, the roles and capabilities of the nodes, and the types of data streams shared thereamong, a theoretically achievable throughput may exist. For example, a video stream shared by a source in an IPTV scenario may be bitrate-adjustable, such that higher bitrate results in better quality video but also a greater size of the data stream. Based on the selection of routing patterns, the achievable throughput to the nodes of the network may vary. However, it may be difficult to select a routing pattern that enables a comparatively high theoretical throughput, especially in view of the range and complexity of network characteristics that may affect the theoretical throughput.

It may be appreciated that a high theoretical throughput may be achieved by endeavoring to consume the entire network capacity of all nodes in the redistribution of the one or more data streams. For a particular node, the consumption of upload capacity is a factor of the selection of routing trees through the node. Also Thus, the theoretically achievable throughput of the data streams is an aggregate function of the selection of routing trees, and the selection of a routing tree set in furtherance of consuming a greater share of the capacities of the nodes and of the connections may promote an increase in the theoretical throughput of the session.

Techniques may be devised for modeling a network in a manner that facilitates the selection of a high-throughput routing pattern for distributing one or more data streams to the nodes of the peer-to-peer communications session. Such techniques may involve modeling the set of potential routing trees for the communications stream according to a linear programming model, wherein the theoretically achievable throughput of the network may be calculated as a sum of the uploading throughputs of the nodes, which may in turn be adjusted through the apportionment of the data stream among the set of available routing trees. For example, a primal model may be devised that permits the calculation of a theoretical throughput that may be desirably increased; alternatively, a linear programming dual model may be devised that permits the calculation of a theoretical networking cost that may be desirably reduced to expand the utilization of networking resources. By structuring the model such that the parameters of the model may be adjusted to increase this calculation, these techniques facilitate the automated selection of routing trees in the peer-to-peer communications session in a manner that promotes the achievable throughput.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 4 is a pseudocode block illustrating an exemplary iterative process for applying a linear programming dual model to select low-cost routing trees a single-data-source communications session.

FIG. 5 is a pseudocode block illustrating a technique for selecting low-cost routing trees form a routing tree set in a peer-to-peer communications network.

FIG. 6 is a pseudocode block illustrating another technique for selecting low-cost routing trees form a routing tree set in a peer-to-peer communications network.

FIG. 7 is a pseudocode block illustrating yet another technique for selecting low-cost routing trees form a routing tree set in a peer-to-peer communications network.

FIG. 8 is a pseudocode block illustrating yet another technique for selecting low-cost routing trees form a routing tree set in a peer-to-peer communications network.

FIG. 10 is a pseudocode block illustrating an exemplary iterative process for applying a linear programming dual model to select low-cost routing trees a multiple-data-source communications session.

DETAILED DESCRIPTION

Figure 1:
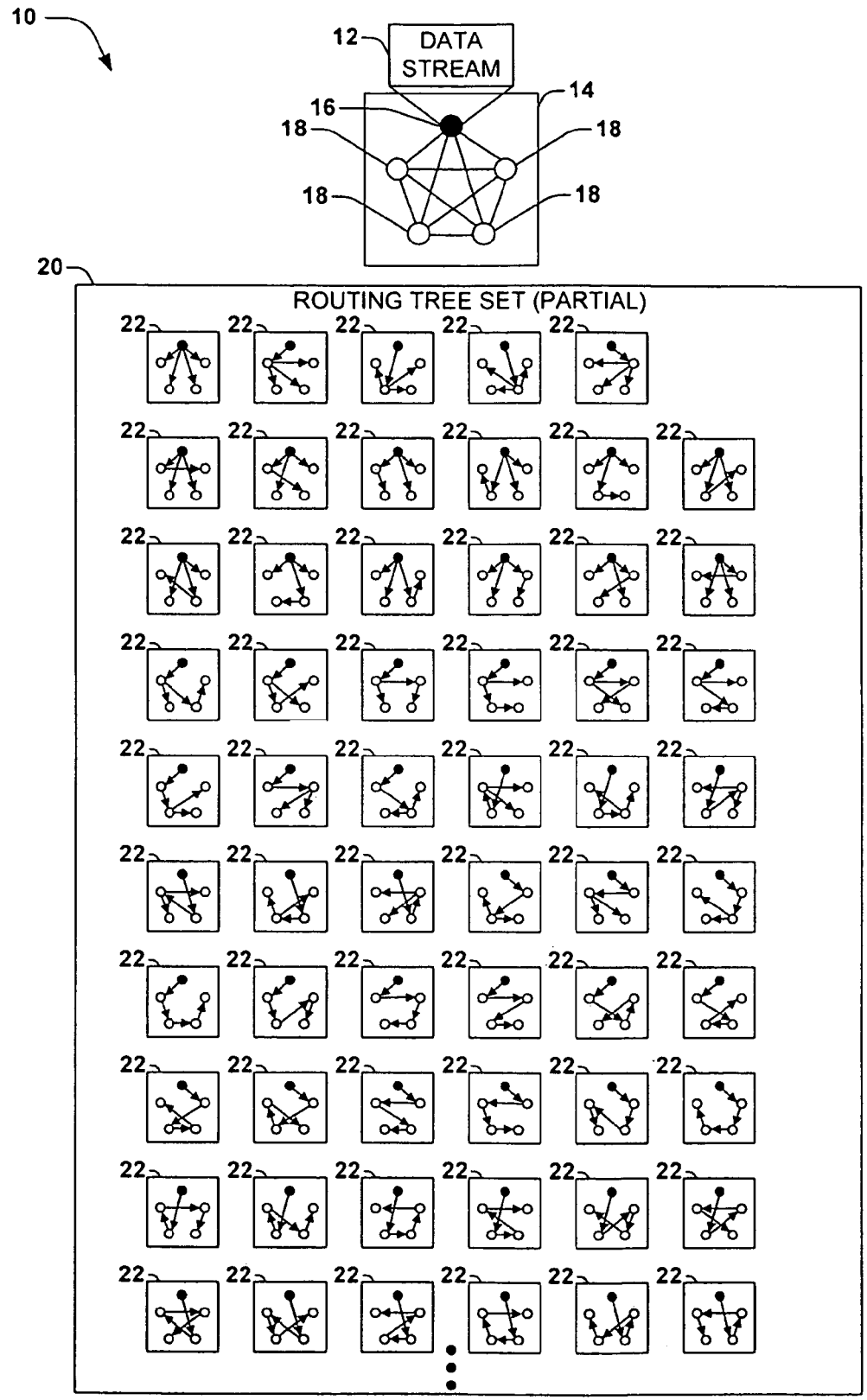
FIG. 1 is an illustration of a routing tree set comprising a set of routing trees whereby a data stream may be transmitted from a source to a set of receivers.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Peer-to-peer communication sessions involve a transmission of a data stream among a set of nodes (e.g., computers or devices) over a communications network. In contrast with more conventional data transfer sessions wherein a source sends the data stream to all receivers, a peer-to-peer communications session enables receivers to retransmit a portion of the data stream to other receivers. By utilizing the upload capacity of the nodes, the peer-to-peer communications model improves both the availability and the delivery of the resource to other receivers while alleviating some of the communications burden on the source.

Based on the capacity of the network, a data stream may be reliably deliverable over the network to the receivers at a particular data rate, such as a bitrate of a video stream. It may be desirable to configure the peer-to-peer session to increase the data rate of the stream; e.g., a network of a higher sustainable capacity may be able to deliver a higher-quality video stream than a network of a lower sustainable capacity. Consequently, it may be desirable to organize the peer-to-peer communication to approach, if not meet, a theoretically achievable throughput limit of the network. One such technique involves dividing the data stream into data substreams having a lower data rate, each of which may be sent over a different routing tree. By choosing a variety of routing trees covering the node set, each handling a particular data substream of a comparatively small data rate, the delivery of the data substreams may be adjusted to enhance the achievable throughput of the aggregated data stream.

However, selecting an advantageous organization of the peer-to-peer session may be complicated by the range of variables describing the capabilities of the network and clients and the nature of the peer-to-peer session. As a first example, the communications session may involve the transmission of one data stream by one source (such as in an IP television scenario, where a video stream is to be broadly delivered) or a plurality of data streams shared by a plurality of sources (such as in a media conferencing scenario, where several sources wish to share a media stream of a participant with the other participants in the conference.) As a second example, the capabilities of the nodes and the network may vary among scenarios. In many cases, the rate-limiting factor of a node is the upload capacity, which is typically much smaller than the download capacity of the node. However, download capacity may also factor into the allocation and selection of routing paths (e.g., a particular node may be unable to receive a large number of streams at a high bitrate.) Connection capacity may also be a factor; e.g., a sending node and a receiving node may be ready to exchange information, but the capacity of the network connection between the sending node and the receiving node may be a limiting factor. Other relevant parameters may also vary, such as the size of the network (e.g., a small number of sources and receivers or a large number), the interconnectedness of the nodes (e.g., each node may able to reach all other nodes in the node set, or may be limited to a subset of neighboring nodes), and the outbound connections cap of the nodes (e.g., a node may or may not be limited in the number of receivers to which the node may concurrently send data.) The network may or may not also be supported by one or more helpers, which are not necessarily included in the full data stream but may offer upload capacity that may be utilized to retransmit a portion of the data stream to receivers. Due to the range of these variables, a peer-to-peer organization that enables a high data rate in one scenario may be limited to a lower achievable data rate in another scenario.

An additional complication arises from the range of available routing trees, which grows exponentially with the number of nodes in the network. FIG. 1 illustrates an exemplary scenario 10 involving a delivery of a data stream 12 to a node set 14 comprising a source 16 and four receivers 18 that may redistribute the data stream 12 to the other receivers 18. Among these nodes, a routing tree set 20 may be devised of routing trees 22 specifying an ordering of the delivery of the data stream 12 (or a portion thereof) among the nodes. As FIG. 1 illustrates, even a comparatively small node set 14 with only one source 16 and four receivers 18 may permit dozens of routing trees of the data stream 12 among the nodes (only some of which are illustrated in this exemplary scenario 10.) A source 14 participating in the peer-to-peer session may therefore consume a nontrivial amount of computing resources simply while evaluating this range of options and selecting routing trees 22 of the routing tree set 20 over which the data substreams comprising the data stream 12 may be delivered.

Figure 2:
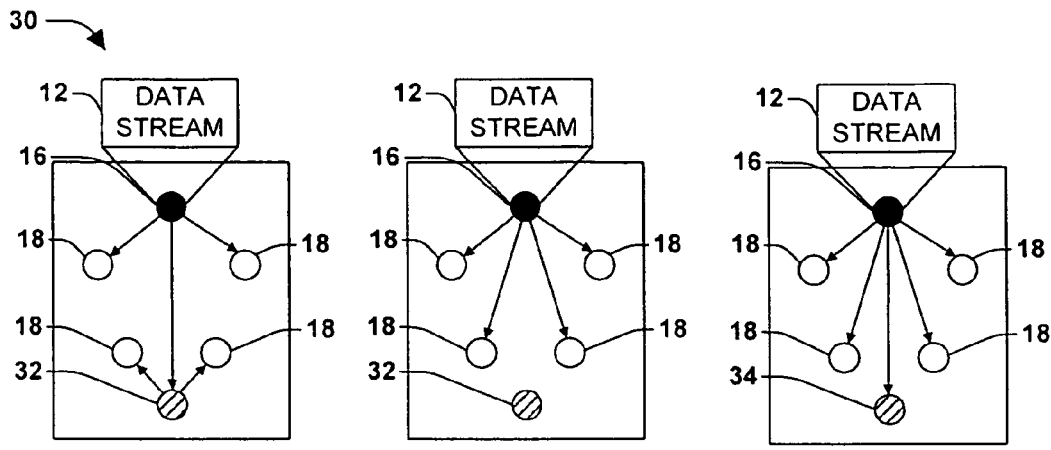
FIG. 2 is an illustration of routing trees involving a helper that may be optionally included in the routing of the routing tree.

Yet another additional complexity may arise depending on whether or not the node set 14 includes or excludes helpers that may redistribute the data stream 12, but are not consumers of the data stream 12, and may be omitted from some or all of the selected routing trees 22 without compromising the desired delivery of the data stream 12 to all receivers 18. FIG. 2 illustrates two valid routing trees and one invalid routing tree pertaining to a node set 14 featuring a helper 32. In the first routing tree, the source 16 transmits the data stream 12 to two receivers 18 and to the helper 32, which retransmits the data stream 12 to the remaining two receivers 18. In the second routing tree, the source 16 delivers the data stream 12 to all receivers 18 but not to the helper 32; this is an acceptable routing tree 22 because the helper 32 does not consume the data stream 12. Moreover, transmitting the data stream 12 to the helper 32 in this second routing tree 16 would be inefficient because no receiver 18 to which the helper 32 may transmit the data stream 12. The third routing tree illustrates this invalid routing, wherein a helper 32 is delivered a portion of the data stream 12 but does not retransmit the data stream to any receiver 18. In this routing tree, the helper is represents a "leaf helper" 34 that exists as a child node in the routing tree 22 having no receivers 18 as child nodes, creating an inefficiency. By contrast, the helper 32 in the first routing tree is a "non-leaf" helper, as it transmits to two receivers 18. Thus, peer-to-peer networks may optionally include one or more helpers 32 to facilitate the redistribution of the data stream 12, but the routing of the data stream 12 desirably excludes the inclusion of leaf helpers 34.

In view of these complexities, techniques may be developed to facilitate the organization of the peer-to-peer communications session in a manner that enables a data rate throughput that approaches, and in certain cases equals, a theoretically achievable data rate limit. Some of these techniques involve a modeling of the peer-to-peer network in a particular manner that promotes an evaluation of the options and a calculation of the achievable throughput of a particular configuration. If the network may be represented in this manner, an automated calculation and comparison of various configurations may be performed to consider the alternatives and to choose a well-performing configuration, and to allocate data substreams of the data stream for transmission to the receiver nodes in a reliable and sustainable manner. However, the complexities and range of variables may hamper the development of a model that applies well in many scenarios.

Presented herein are several techniques for organizing the peer-to-peer communications session according to various models, for evaluating the options presented by the respective models applied to a particular peer-to-peer communications session, for choosing an acceptable routing tree set and data substreams transmitted thereacross that enable a high theoretical data rate throughput, and for allocating and transmitting the respective data substreams over the respective routing trees to the receivers. Many of these techniques rely on a linear programming model, wherein the data rates of data substreams allocated to particular routing trees may be adjusted to achieve an advantageous theoretical throughput. The linear programming model may be devised as a primal model, yielding a calculable throughput rate that may be desirably increased by adjusting the parameters of the primal model representing the allocation of data rates to various routing trees. Alternatively, the linear programming model may be devised as a linear programming dual model, yielding a calculable network cost representing the inefficient allocation of resources (such as upload capacity) that may be advantageously reduced to improve the full utilization of network resources. For example, a routing tree that includes a node that is already retransmitting other data substreams may be represented as having a higher network cost than a routing tree that includes only nodes having greater available upload capacity, which may be able to handle a greater data rate of the data substream. The reduction of the network cost may therefore represent a more efficient organization of network resources that enables a higher throughput of the data streams in the peer-to-peer communications session. Those familiar with linear programming models may appreciate the use of such models in the holistic evaluation and automated configuration of the peer-to-peer communications session.

Figure 3:
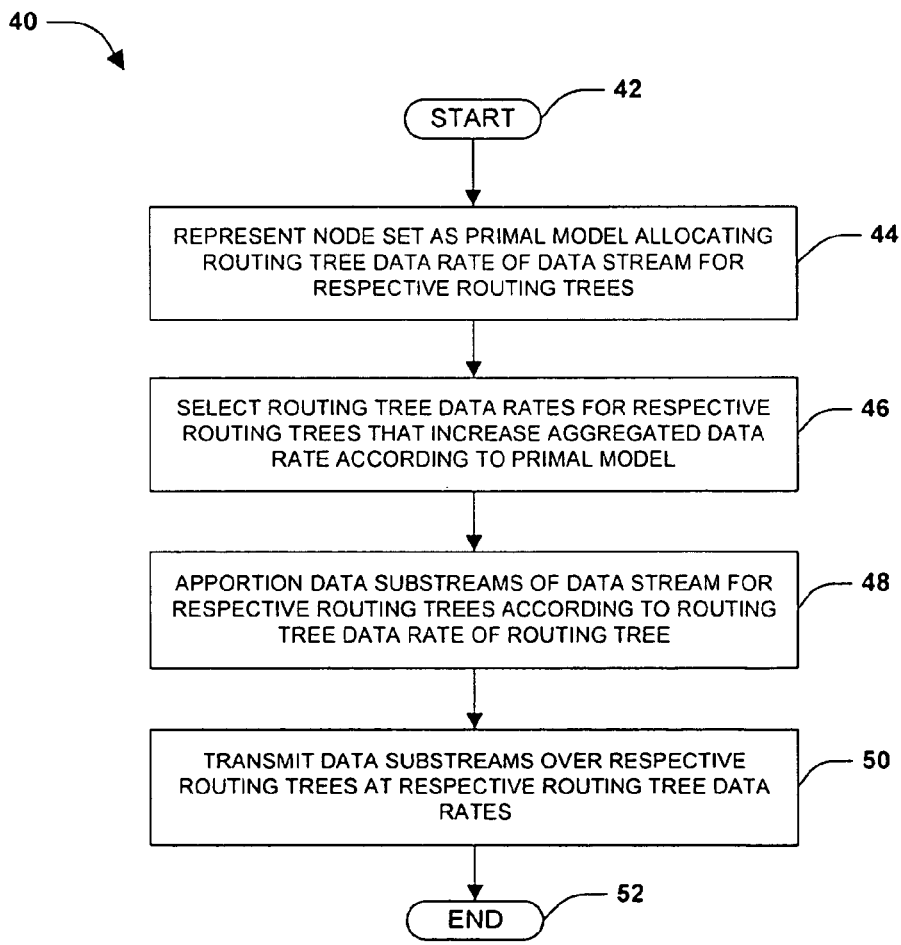
FIG. 3 is a flow chart illustrating an exemplary method of transmitting a data stream among a node set comprising a source of the data stream and a set of receivers over a routing tree set.

FIG. 3 presents a first technique for achieving the configuration of the peer-to-peer communications session having a single data stream 12 shared by a single source 16. This scenario may pertain, e.g., to an IP television arrangement, wherein a source of a video stream transmits the stream to a (potentially large) set of receivers 18 that share the network burden by redistributing portions of the video stream. The first technique is illustrated in FIG. 1 as an exemplary method 40 of transmitting a data stream 12 among a node set 14 comprising a source 16 of the data stream 12 and a set of receivers 18 over a routing tree set 20, where respective routing trees 22 specify a route of the data stream 12 among the source 16 and the receivers 18. The exemplary method 40 of FIG. 3 begins at 42 and involves representing 44 the routing tree set 20 as a primal model allocating a routing tree data rate of the data stream 12 for respective routing trees 22. The exemplary method 40 also endeavors to restrict the routing tree data rate within an upload capacity of respective senders in the route of the routing tree 22 (a "sender" comprising any node that delivers a data substream to another node.) The exemplary method 40 also involves selecting 46 routing tree data rates for the respective routing trees 22 that increase an aggregated data rate according to the primal model. When the data rates for various routing trees 22 have been selected, the exemplary method 40 also involves apportioning 48 data substreams of the data stream 12 for the respective routing trees 22 according to the routing tree data rate of the routing tree 22, and transmitting 50 the data substreams over the respective routing trees 22 at the respective routing tree data rates. Having determined the routing of the data stream 12 according to the upload capacities of the nodes of the node set 14 with the assistance of the primal mode, the exemplary method 10 thereby achieves the delivery of the data stream 12 to the nodes of the node set 14 at a comparatively high throughput, and so ends at 52.

One such primal model that may be used in this manner is represented by the mathematical formula:

$$\text{increase} \quad r = \sum_{t \in T} y_t$$
$$\text{subject to} \quad \sum_{t \in T} m_{v,t} y_t \leq C(v) \forall\, v \in V$$
$$y_t \geq 0 \forall\, t \in T.$$

This mathematical formula relies on the following notation:
V represents the set of receivers and the source 16;
v represents a sender in a routing tree 22;
C(v) represents the upload capacity of sender v;
T represents the routing tree set 20;
t represents a routing tree 22;
$y_t$ represents the routing tree data rate of routing tree t;
$m_{v,t}$ represents the number of receivers to which sender v transmits the data substream in routing tree t; and
r represents the aggregated data rate of the data stream 12 transmitted over the routing trees 22.

This primal model mathematical formula therefore suggests calculating the throughput of the data stream 12 as the sum of the data rates of the data substreams transmitted over the routing trees 22 of the routing tree set 20, subject to the upload capacity constraints of the senders. It may be appreciated that this model considers the allocation of data substreams across the entire routing tree set 20, and that an advantageously high result may involve the selection of a very large number of routing trees 22, resulting in the segmentation of the data stream 12 into a large number of data substreams, some or all of which may potentially have a small routing tree data rate. An evaluation of the network using this primal model may therefore strive to expand the consumption of upload capacity of the senders in the node set 14 in furtherance of enabling an advantageously high sustainable bit rate of the data stream 12.

While this primal model may be useful, it may be difficult to determine the proximity of the achieved throughput (i.e., the value of r) to the theoretical throughput limit. An alternative model may therefore be devised, wherein the primal model is represented as a linear programming dual model that associates a routing price with respective senders in the route of a routing tree 22. The routing price in turn represents a per-unit flow cost of the data substream through a particular sender. For example, if the sender has plentiful upload capacity, the per-unit flow cost through the sender may be indicated as a low cost, but if the sender is already uploading a substantial aggregate data rate for other data substreams, the routing tree 22 may have a high cost. Accordingly, the selecting 46 may comprise selecting routing capacities that reduce the routing prices of the senders of the routing trees 22 in the routing tree set 20. By modeling the utilization of network resources according to flow costs instead of throughput, the linear programming dual model may therefore facilitate an evaluation of the efficiency of a particular peer-to-peer organization, rather than simply calculating the aggregate throughput without reference to a theoretical throughput limit.

One such linear programming dual model that may be used in this manner is represented by the mathematical formula:

$$\text{reduce} \quad \sum_{v \in V} C(v) p_v$$

$$\text{subject to} \quad \sum_{v \in V} m_{v,t} p_v \geq 1 \forall t \in T,$$

$$p_v \geq 0 \forall v \in V.$$

This mathematical formula relies on the following notation:
  V represents the set of receivers and the source 16;
  v represents a sender in a routing tree 22;
  C(v) represents the upload capacity of sender v;
  T represents the routing tree set 20;
  t represents a routing tree 22;
  $m_{v,t}$ represents the number of receivers to which sender v transmits the data substream in routing tree t; and
  $p_v$ represents the per-unit flow cost of sender v.

This linear programming dual model mathematical formula therefore suggests calculating the throughput of the data stream 12 as the sum of the efficiencies whereby the uploading capacities of the senders in the node set 14 are consumed. Again, it may be appreciated that this model considers the allocation of, data substreams across the entire routing tree set 20, and that an advantageously high result may involve the selection of a very large number of routing trees 22, resulting in the segmentation of the data stream 12 into a large number of data substreams, some or all of which may potentially have a small routing tree data rate.

The linear programming models presented herein for the single-data-stream scenario therefore involve an evaluation of the relative capacities of the routing trees 22 and an efficient allocation of the data rate of the data stream 12 among various data substreams to permit a comparatively high sustainable data rate of the data stream 12. However, it may be difficult to evaluate all of the routing path trees 22 in the routing path set 20, due to the number of routing trees 22 that are available for the network (as illustrated in FIG. 1.) A brute-force concurrent or consecutive evaluation of all routing trees 22 may be prohibitively resource-intensive, especially in the case of a large network where the potential routing trees 22 may number billions or more. Instead, the selecting 96 may be performed by iteratively selecting the routing capacities of particular routing trees 22 for transmitting particular data substreams.

In one such iterative approach utilizing the linear programming dual model, the selecting may involve iteratively selecting the routing capacities of the routing trees by selecting a low-cost routing tree 22 for an iteration and allocating the routing tree data rate for the low-cost routing tree 22 based on the residual upload capacities of the senders in the routing tree 22. The iteration may also involve calculating the residual upload capacities of the senders in the routing tree 22 (for use in assessing the costs of various routing trees 22 in future iterations.) The iterative selecting of low-cost routing trees 22 may continue until the per-unit flow cost of the routing trees 22 is at least one. In this and other calculations, the per-unit flow cost of sender v may be calculated according to the mathematical formula:

$$p_i(v) = p_{i-1}(v)\left(1 + \varepsilon \frac{m_{v,t_i} y_i}{C(v)}\right)$$

This mathematical formula relies on the following notation (along with the notation previously discussed for other mathematical formulae):
  i represents an iteration of the selecting;
  $p_i(v)$ represents the per-unit flow cost of sender v during iteration i; and
  $\varepsilon$ represents an optimality constraint.

The optimality constraint may represent a proximity of the selected routing tree set 20 and data substreams allocated thereacross to a theoretical limit. A higher optimality constraint may result in an improved selection of routing trees 22 and a higher data rate for the data stream 12, but at a cost of additional computing time to achieve the selection. In accordance with this iterative selecting, the data stream 12 may be iteratively apportioned to a low-cost routing tree 22, and the upload capacities of the senders of the selected routing tree 22 may be recalculated to indicate a lower upload capacity (i.e., a higher network cost) for future iterations, until the data stream 12 has been apportioned to low-cost routing trees 22.

FIG. 4 illustrates an exemplary pseudocode block 60 that embodies such iterative selecting. It may be appreciated that the pseudocode block 60 is presented in a pseudocode language that may not conform to the syntactic and logical constraints of any particular programming or mathematical language. Rather, this pseudocode block 60 (and those presented and discussed elsewhere herein) is presented to illustrate a sequence of logical concepts that cooperatively achieve the data stream routing techniques discussed herein.

In the exemplary pseudocode block 60 of FIG. 4, some parameters are first initialized (such as the calculated flow through a particular node v and the total allocated data rate of the data stream Y. The exemplary pseudocode block 60 then iteratively selects a routing tree 22 from the routing tree set 20 that has an advantageously low per-unit flow cost (as determined by the upload capacities of the nodes in the respective routing tree 22.) The selected routing tree 22 is assigned a flow rate based on the achievable data rate of the nodes comprising the routing tree 22 (i.e., the data rate that fully utilizes the upload capacity of the lowest-capacity sending node in the routing tree 22.) The available capacities of the sending nodes in the routing tree 22 are then reduced by the data rate of the substream, and a next iteration is performed, etc., until further apportionment of the data stream 12 among routing trees 22 may not be advantageous (e.g., when the cost of including a routing tree 22 does not offset the infrastructure costs of using the routing tree 22.) The resulting allocation of the data stream 12 may therefore provide a selection of routing trees 22 and routing tree data rate selection that produces a desirably high sustainable data rate for the data stream 12.

However, in some scenarios, a linear programming dual model for selection may rely too heavily on an allocation of data substreams through a particular sender that may exceed the upload capacity of the sender, and may result in a potentially unsustainable allocation. In other scenarios, the upload capacity of a sender may be reduced, thereby impairing the previously sustainable data rate of the data substreams routed through the sender. In these and other scenarios, it may be advantageous to include a scalable parameter in the allocation techniques (such as the mathematical formulae) that calculate the bandwidth allocation of the data substreams.

One technique that enables scalability is the inclusion of a scaling factor, $\mathcal{L}$, that may be applied to the allocated routing tree data rates after the calculation. Although the scaling reduces the overall data rate, the reduction promotes the sustainability of the data rate of the data stream 12 through the node set 14 and the preservation of the quality of the data stream 12. For example, $\mathcal{L}$ may be computed according to the mathematical formula:

$$\mathcal{L} = \max_{v \in V} \frac{\upsilon(v)}{c(v)}$$

This mathematical formula relies on the following notation (along with the notation previously discussed for other mathematical formulae):

C(v) represents the upload capacity of sender v, and
U(v) represents an aggregate upload rate of sender v among all routing trees.

This scaling factor may be applied to the calculated routing tree data rates of the selected routing trees 22. This scaling may also be factored in during the iterative processing by including it as an element of the networking cost. For example, the per-unit flow cost of sender v during a first iteration of the selecting of routing trees 22 may be calculated according to the mathematical formula:

$$p_0(v) = (1+\varepsilon)((1+\varepsilon)\mathcal{L})^{\frac{-1}{\varepsilon}}$$

(using the notation previously discussed for other mathematical formulae.)

This value may be utilized for the initial constant ($\delta$) comprising the initial value of the per-unit flow cost. This factor is then applied to the computed routing tree data rate of the first iteration, and is propagated through subsequent iterations as a progressively adjusted per-unit flow cost.

These dual models and iterative selections involve an identification of a low-cost routing tree to be assigned a data substream. Again, this identification may be difficult due to the number of available routing trees 22, and a brute-force search may be prohibitively lengthy even for small node sets 14. The search may be improved by using various search techniques (heuristically guided state searches, learning processes such as artificial neural networks and genetic programming, etc.), but these general-purpose techniques may achieve only modest improvement in the search process, and may not identify a sufficiently low-cost tree within the available time window of a particular iteration.

Alternatively, low-cost routing tree identification techniques may be devised and utilized within the dual models. Such low-cost routing tree identification may be attuned to the details of the network, such as the full or partial interconnectedness of the network, the capping or uncapping of the upload connections of each sender, and the presence or absence of helpers 32 in the node set 14. The selection of an appropriate low-cost, routing tree identification technique may therefore yield suitably low-cost routing trees for any particular session or iteration.

A first low-cost routing tree identification technique may be applied to dual models where the node set 14 comprises a source 16, receivers 18, and zero or more helpers 32, all of which are capable of sending to the respective receivers 18 and respective helpers 32 (such as a fully interconnected network) without an upload connections cap. If helpers 32 are included, the networking cost for helpers 32 may be slightly increased to represent the additional complexity of routing through a helper 32 that is not a consumer of the data stream 12. Thus, a helper 32 will only be selected in a routing tree if the routing cost is otherwise lower than for a receiver 18. This difference may be represented by calculating the routing process as an effective routing price according to the mathematical formula:

$$\hat{p}(v) = \begin{cases} p(v) \text{ if } v \in s \cup R \\ p(v)\frac{|R|}{|R|-1} \text{ if } v \in H \end{cases}$$

This mathematical formula relies on the following notation (along with the notation previously discussed for other mathematical formulae):

$\hat{p}(v)$ represents the effective routing price,
s represents the source 16,
R represents the set of receivers 18, and
H represents the set of helpers 32.

The selecting of a low-cost routing tree 22 may therefore be computed as a one- or two-connection routing tree: either the data substream of the routing tree 22 may be delivered directly from the source 16 to the receivers 18, or may be delivered from the source 16 to a receiver 18 or helper 32 that retransmits the data substream to the remaining receivers 18. The routing tree-data rate for the generated routing tree 22 is calculated as a maximum of the upload capacity of the selected node and the source, or a scaled portion thereof. This manner of selecting 46 low-cost routing trees 22 may be performed during each iteration, and the subsequent iteration may account for the depletion of upload capacity due to the selected low-cost routing trees 22 identified in preceding iterations.

FIG. 5 illustrates a pseudocode block 70 embodying this manner of selecting 46 low-cost routing trees 22. In particular, the selecting 46 of a low-cost routing tree 22 may involve selecting a sender v having a low effective routing price among the senders of the node set according to this logic: if v is the source 16, generate a routing tree 22 routing a data substream from the source 16 to the receivers 18; if v is a receiver 18, generate a routing tree 22 routing a data substream from the source 16 to v and from v to the receivers 19 except v; and if v if a helper 32, generate a routing tree 22 routing a data substream from the source 16 to v and from v to the receivers 18. The generated routing tree 22 may then be added to a set of selected routing trees 22 over which respective data substreams are to be delivered at designated routing tree data rates.

Another low-cost routing tree identification technique may be applied to a network comprising a node set 14 including a source 16 of a data stream 12 and receivers 18 (but having no helpers 32), where all senders are capable of sending to the respective receivers 18 (i.e., in a fully interconnected network), but with an upload connections cap of upload connections. For example, the senders may be capped (either internally or by the network) to establish no more than a designated number of concurrent upload connections. In this type of network, the exemplary pseudocode block 70 of FIG. 5 may not be applicable, because the generated routing trees may specify too many upload connections from a particular sender.

For this type of network, a second low-cost routing tree identification technique may be devised. In this technique, a routing tree 22 may be generated by selecting a sender v having a low routing price among the senders of the node set 14 and generating a routing tree 22 that routes a data substream from the source 16 to v. The routing tree 22 may then be recursively extended through the receivers 18 of the node set 14 according to a low-cost node identification. For example, after generating the first connection in the routing tree 22 from the source 16 to a first sender, the recursive extending may involve selecting a sender v having a low routing price among the receivers included in the routing tree, and having at least one fewer upload connection as compared with the upload connections cap. The generating may also involve selecting a receiver $v_a$ having a low routing price among the receivers not yet included in the routing tree (i.e., with which the sender v may efficiently communicate over the network.) The receiver $v_a$ may then be added to the routing by extending the routing tree 22 to route the data substream from sender v to receiver $v_a$. This recursive selecting may continue until the routing tree 22 includes the set of receivers 18. The routing tree 22 may then be added to the set of routing trees 22 over which data substreams are to be transmitted, and the next iteration may involve selecting a new low-cost routing tree 18 taking into account the upload capacity allocations and upload connections allocated for respective nodes in previous iterations.

FIG. 6 illustrates a pseudocode block 80 embodying this second low-cost routing tree identification technique, wherein:

A represents the set of senders (both the source 16 and receivers 18) that are already in a routing tree 22 being recursively generated;

B represents the set of receivers 18 that are not yet included in the routing tree 22; and Ã represents the subset of receivers in set A that have at least one fewer allocated upload connection as compared with the upload connection cap.

However, it may be appreciated that the pseudocode block 80 of FIG. 6 is not the only embodiment of this second low-cost routing tree identifying technique, and that those of ordinary skill in the art may devise other embodiments of this technique.

A type of network to which these techniques may be applied involves a fully-interconnected network comprising the source 16, the receivers 18, and zero or more helpers 32, and also includes an upload connections cap applied to at least some of the nodes of the node set 14. It may be appreciated that this type of network may not be adequately serviced by either the first low-cost routing tree identifying technique (as it does not account for the upload connections cap) or the second low-cost routing tree identifying technique (as it does not anticipate the inclusion of helpers 32, and therefore may inefficiently route portions of the data stream 12 to leaf helpers 34.)

Therefore, a third low-cost routing tree identifying technique may be devised for networks involving a node set 14 comprising at least zero helpers 32 alongside the source 16 and the receivers 18, and where the source 16, receivers 18, and helpers 32 are capable of sending to the respective receivers 18 and respective helpers 32 with an upload connections cap of upload connections. In this scenario, the selecting 46 may again involve selecting a sender v having a low routing price among the senders and helpers of the node set 14, generating a routing tree 22 routing a data substream from the source 16 to v, and recursively extending the routing tree 22 to the other receivers 18. However, in this scenario, the recursive extending may involve selecting a sender $v_a$ having a low routing price among the senders included in the routing tree and having at least one fewer upload connection as compared with the upload connections cap, and extending the routing tree 22 to route the data substream from $v_a$ to respective low-priced nodes not yet included in the routing tree 22 until the upload connections of $v_a$ equal the upload connections cap. This recursive extending may continue until the routing tree 22 includes the set of receivers 18, and the generated routing tree 22 may then be added to the set of routing trees over which respective data substreams are to be transmitted.

While this third low-cost routing tree identifying technique may generate adequately low-cost routing trees, it may also involve selecting routing trees 22 that include leaf helpers 34. An improvement of this third technique involves removing leaf helpers 34 in a manner that further reduces the network cost of the selected routing tree 22. According to this improvement, after selecting the low-cost routing tree, at least one leaf helper 34 may be removed by removing at least one leaf helper by first identifying a leaf helper in the routing tree (e.g., by iterating over the set of helpers 32 and identifying whether any helper 32 is included in the routing tree 22 but has no children.) Upon such identifying, the improved third technique may remove the leaf helper 34 by selecting a high-cost node in the routing, tree having at least one upload connection (i.e., having at least one child node), removing the leaf helper 34 from the routing tree 22, and transferring an upload connection from the high-cost node to the sender of the leaf helper 34 in the routing tree 22. Because removing the leaf helper 34 provides at least one available outbound connection to the sender (i.e., the parent) of the leaf helper 34, the now-available outbound connection may be utilized to reduce the burden of sending to at least one receiver through the high-cost node. Moreover, if the high-cost node is also a helper 32, the high-cost node might also be removed by attempting to transfer the receivers of the high-cost node to other nodes. This may be achieved by identifying at least one low-cost node having at least one fewer upload connection as compared with the upload connections cap, transferring the receivers 18 of the high-cost node to the at least one low-cost node, and removing the high-cost node from the routing tree 22. In this manner, this improved third technique thereby improves the routing tree 22 generated by the basic third technique by removing leaf helpers 34 while concurrently transferring connections from high-cost senders to low-cost senders.

FIG. 7 provides a pseudocode block 90 embodying the improved third low-cost routing tree identifying technique, utilizing the same notation used for the other mathematical formulae and pseudocode blocks discussed herein. This pseudocode block 90 first recursively generates the routing tree 22 according to the basic third technique (e.g., by recursively selecting low-cost senders in the routing tree 22, and adding them to the routing tree 22 with as many not-yet-included receivers 18 and helpers 32 as permitted by the upload connections cap), and then removes leaf helpers 34 by transferring such connections to the sender of the leaf helper 34 and to other low-cost senders. However, the pseudocode block 90 of FIG. 7 represents only one embodiment of such techniques, and those of ordinary skill in the art may devise other embodiments of the basic and improved third low-cost routing tree identifying techniques.

Still another type of network to which these techniques may be applied involves a partially interconnected network, wherein at least one sender in the node set 14 may be unable to connect to at least one receiver 18 in the node set 14. The Internet may represent one such network, wherein the interconnectedness of nodes in a peer-to-peer communication session may be limited (e.g.) by firewalls, geographic distances, and intermittent links that provide unacceptably high latency between two nodes. The peer-to-peer communication session may still be achieved by routing the data stream from such a sender to such a recipient through a third node that is accessible to both the sender and the receiver. However, the first three low-cost routing tree identifying techniques may be inapplicable to such networks due to the basic presumption of such techniques that the node set 14 is fully interconnected.

For such networks, a fourth low-cost routing tree identifying technique may be devised that takes into account the connected of any particular node with a subset of nodes ("neighboring nodes") in the node set 14. This technique may be applied where the network comprises at least zero helpers 32 alongside the source 16 and the receivers 18, and where the source 16, receivers 18, and helpers 32 are capable of sending to a neighbor set of respective receivers 18 and respective helpers 32. The routing trees 22 identified thereby respect the neighboring node limitations of the nodes and only include routings of a node to and from its neighboring nodes. According to this fourth technique, selecting the low-cost routing tree comprises selecting a sender v having a low routing price among the senders and helpers 32 of the node set 14; generating a routing tree 22 routing a data substream from the source 18 to v; and recursively extending the routing tree 32. However, in this fourth technique, the extending involves selecting a sender $v_a$ having a low routing price among the receivers 18 included in the routing tree 32, and extending the routing tree 22 to route the data substream from $v_a$ to nodes in the neighbor set of $v_a$ that are not yet included in the routing tree 22. This extending may continue until the routing tree includes the set of receivers 18.

In similar fashion as with the third technique, the fourth low-cost routing tree identifying technique may be improved by endeavoring to remove particular helpers 32 while further reducing the cost of the selected routing tree 22. This improved technique may include removing leaf helpers 34, which may be performed in a similar manner as in the improved third technique (while also respecting the limitation that an upload connection may be transferred from a first sender to a second sender only if the receiver 18 of this upload connection is in the neighbor node set of the second sender.) An additional improvement may involve a reevaluation of the included non-leaf helpers 32 to determine whether a more efficient routing may be achieved by excluding the helper 32. For respective helpers 32, the improved fourth technique determines whether the upload connections (i.e., the receivers) of the non-leaf helper 32 have at least one neighbor node other than the non-leaf helper 32. If all of the receivers have a neighbor node other than the non-leaf helper 32, the non-leaf helper is a candidate for removal. The improved fourth technique may therefore iteratively transfer the upload connections of the non-leaf helper 32 to respective neighbor nodes that have a lower routing cost than the non-leaf helper 32, thereby reducing the upload connections of the non-leaf helper 32. If all of the upload connections of the non-leaf helper 32 may be removed, the non-leaf helper 32 may then be removed from the routing tree 22. Conversely, if at least one upload connection may not be removed from the non-leaf helper 32, then the non-leaf helper 32 may be retained in the routing tree 22, since it serves to reduce the routing cost to the non-removable upload connection (as compared with alternative routing trees 22.) This removal of non-leaf helpers 22 may be iteratively performed until no more non-leaf helpers 22 may be removed from the routing tree 22, and the routing tree 22 may then be added to the set of low-cost routing trees 22 over which data substreams are to be transmitted.

FIG. 8 presents an exemplary pseudocode block 100 embodying the improved fourth low-cost routing tree identifying technique, which relies on the following notation (along with the notation previously discussed for other mathematical formulae): and $B_u^*$ represents a neighbor node set of a node v in the routing tree 22, $u^*$ represents a neighbor node of a node v.

In this exemplary pseudocode block 100, a routing tree 22 is first generated by recursively extending the routing tree 22 from a node in the routing tree 22 to neighbor nodes, as discussed in the basic fourth technique. The routing tree 22 so generated is then improved first by removing leaf helpers 34, and then by attempting to remove non-leaf helpers 32 by first identifying whether a non-leaf helper 32 is a candidate for removal (i.e., whether all of its upload connections may be transferred to neighbor nodes), and then attempting to transfer away the upload connections to neighbor nodes having a lower routing cost. If all of the upload connections are removed, the non-leaf helper 32 is now a leaf helper 34 that is removed during a subsequent iteration of the routing tree improvement. This iterating continues until no further leaf helpers 34 may be removed and until no more upload connections of non-leaf helpers 32 may be transferred away, and the improved routing tree 22 may then be added to the set of routing trees over which data substreams are to be transmitted. However, the pseudocode block 100 of FIG. 8 represents only one embodiment of these fourth low-cost routing tree identifying techniques, and those of ordinary skill in the art may devise other embodiments of the basic and improved fourth low-cost routing tree identifying techniques.

The techniques discussed heretofore and illustrated in FIGS. 3 through 8 are useful for many types of networks. However, some of these techniques are effective for peer-to-peer communications sessions involving a transmission of a single data stream 12 from a single source 16, such as in internet TV distribution. Other scenarios may involve a transmission of multiple data streams 12 from multiple sources 16 to the receivers of the node set 12 (and some or all of the sources 16 may also be receivers of other data streams 12 sent by other sources 16.) Some modest modifications of these techniques may be more helpful for such multi-data-stream scenarios.

Figure 9:
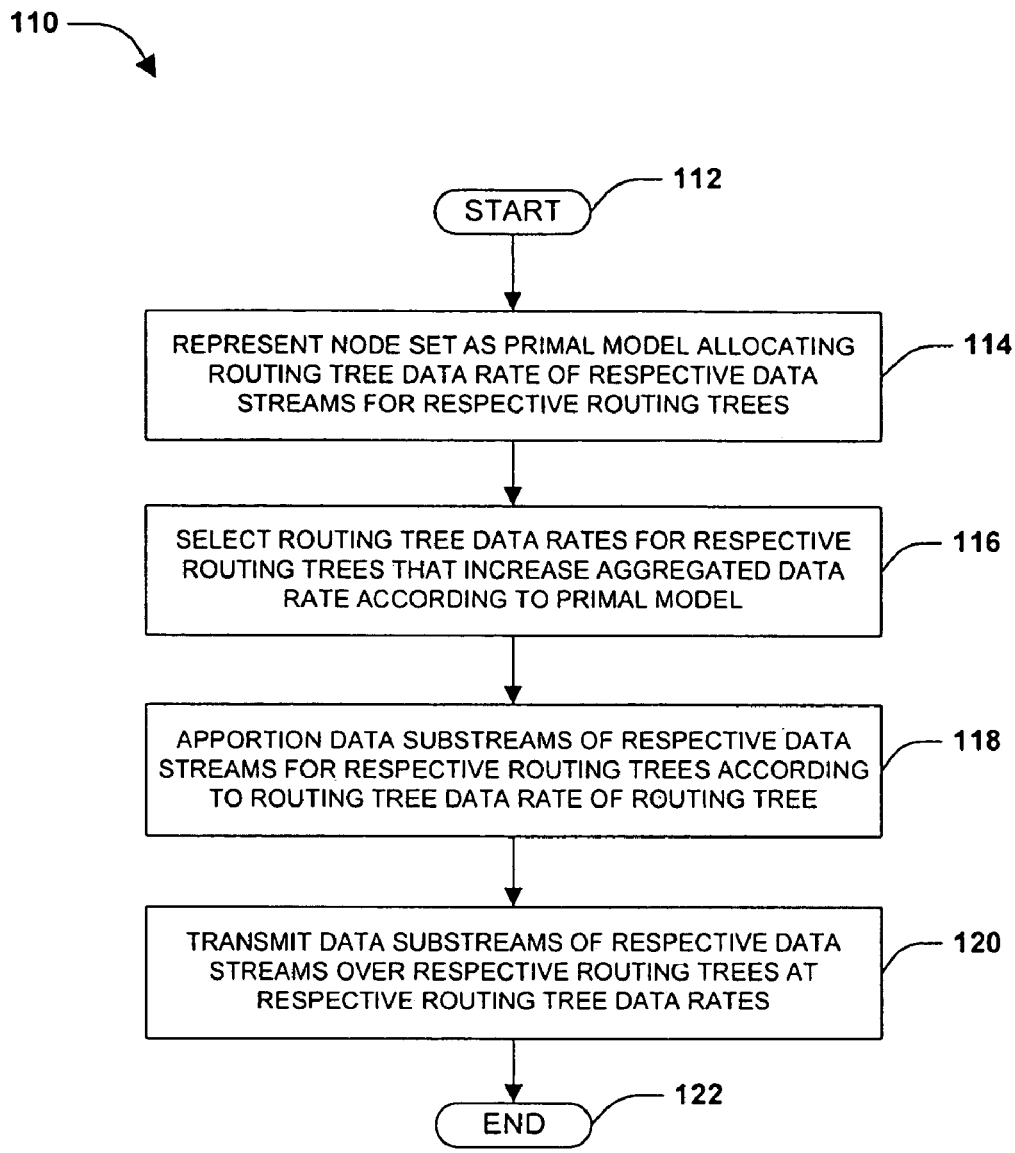
FIG. 9 is a flow chart illustrating an exemplary method of transmitting a plurality of data streams among a node set comprising a source of a respective data stream and a set of receivers over a routing tree set.

FIG. 9 presents one embodiment of these techniques for a multiple-data-stream and multiple-source communications network, illustrated as an exemplary method 110 of transmitting at least two data streams 12 among a node set 14 comprising at least two sources 16 of the respective data streams 12 and a set of receivers 18 over a routing tree set 20, where respective routing trees 22 specify a route of the data stream 12 among a respective source 16 and the receivers 18 (potentially including the other sources 16.) The exemplary method 110 begins at 112 and involves representing 114 the node set 20 as a primal model allocating a routing tree data rate of respective data streams 12 for respective routing trees, where the routing tree data rate of the respective routing trees 22 is within an upload capacity of respective senders in the route of the routing tree 22. The exemplary method 110 also involves selecting 116 routing tree data rates for respective routing trees 22 that increase an aggregated data rate according to the primal model. The exemplary method 110 also involves apportioning 118 data substreams of the respective data streams 12 for respective routing trees 22 according to the routing tree data rate of the routing tree 22, and transmitting the data substreams of the respective data streams 12 over the respective routing trees 22 at the respective routing tree data rates. Having determined the routing of the data streams 12 according to the upload capacities of the nodes of the node set 14 with the assistance of the primal mode, the exemplary method 10 thereby achieves the delivery of the data streams 12 to the nodes of the node set 14 at a comparatively high throughput, and so ends at 122.

One such primal model that may be used in this manner is represented by the mathematical formula:

$$\text{increase } \lambda$$
$$\text{subject to } \sum_{t \in T^k} y_t = \lambda T^k \forall k = 1, 2, \ldots, K$$
$$\sum_k \sum_{t \in T^k} m_{v,t} y_t \leq C(v), \forall v \in V$$
$$y_t \geq 0, \forall t \in T^k, \forall k = 1, 2, \ldots, K$$

This mathematical formula relies on the following notation:
V represents the set of receivers 18 and a respective source 16;
v represents a sender 16 in a routing tree;
k represents a data stream 12;
K represents the set of data streams 12;
$T^k$ represents the routing tree set 20 for data stream k;
t represents a routing tree 22;
$y_t$ represents the routing tree data rate of routing tree t;
$\lambda$ represents a data stream rate multiplier;
$r^k$ represents the data rate of data stream k;
$m_{v,t}$ represents the number of receivers to which sender v transmits the data substream in routing tree t; and
C(v) represents the upload capacity of sender v.

This primal model resembles the primal model applicable to a single-data-stream peer-to-peer communications session, but takes into account the delivery of multiple data streams 12 through respective routing tree sets 20, such that the upload capacity of a sender of a data substream of a first data stream 12 is evaluated with respect to the upload capacity of the sender consumed by sending a data substream of a second data stream 12 (as per the constraint $m_{v,t} y_t \leq C(v)$.) Moreover, this primal model is oriented such that if respective data streams 12 have a relative data rate, the primal model may be used to increase a data stream rate multiplier $\lambda$ that applies proportionally to the relative data rates of all data streams 12. For example, if a first data stream 12 transmits at 1,024 Mbps and a second data stream 12 transmits at 2,048 Mbps, the primal model may be organized to permit the linear programming model to adjust the details of the routing so as to increase the data stream rate multiplier $\lambda$ to a factor of 2.0, such that the first data stream 12 may be transmitted at 2,048 Mbps and the second data stream 12 may be transmitted at 4,096 Mbps.

While this primal model may be useful, it may be difficult to determine the proximity of the achieved throughput (i.e., the value of $\lambda$) to the theoretical throughput limit. An alternative model may therefore be devised, wherein the primal model is represented as a linear programming dual model that associates a routing price with respective senders in the route of a routing tree 22. A linear programming dual model for a multiple-data-stream and multiple-source peer-to-peer communications session may associate a routing price with respective senders in the route of a routing tree 22 of a data stream 12, where the routing price representing a per-unit flow cost of the data substream through the sender. Accordingly, the selecting 116 may comprise selecting routing capacities that reduce the routing prices of the senders of the routing trees 22 of respective data streams 12 in the routing tree set 20.

One such linear programming dual model may be represented according to the mathematical formula:

$$\text{reduce } \sum_{v \in V} C(v) p_v$$
$$\text{subject to } \sum_{v \in V} m_{v,t} p_v \geq z_k \forall t \in T_k, \forall k = 1, 2, \ldots, K,$$
$$\sum_{k=1}^{K} r^k z_k \geq 1$$
$$p_v \geq 0 \forall_v \in V,$$

This mathematical formula relies on the following notation:
V represents a set of 18 receivers and a source 16 of a respective data stream 12;
v represents a sender in a routing tree 22;
C(v) represents the upload capacity of sender v;
$p_v$ represents the per-unit flow cost of sender v; and
k represents a data stream 12 from a source 16;
$r^k$ represents the data rate of data stream k;
$z_k$ represents a data stream constraint of data stream k;
$T_k$ represents the routing tree set for data stream k; and
$m_{v,t}$ represents the number of receivers 18 to which sender v transmits the data substream in routing tree t.

Thus, this mathematical formula for a linear programming dual model of a multiple-data-stream, multiple-source communications network seeks to reduce the network cost of using respective nodes to send data substreams for the set of data streams 12. An evaluation of this model may result in the selection of a set of low-cost routing trees 20 for sending data substreams of the data streams 12 that, together, reduce the cost to respective nodes of the node set 14.

As with the single-data-stream models, the evaluation of the primal model and the linear programming dual model for the multiple-data-stream communications session may be difficult to evaluate for all data streams 12 across all available routing trees 22 in the routing tree set 20. Iterative process may therefore be devised for performing the selecting 116 in an improved manner. In one such iterative process, the per-unit flow cost of a sender v may be calculated according to the mathematical formula:

$$p_i(v) = p_{i-1}(v)\left(1 + \varepsilon \frac{m_{v,t_i} y_i}{C(v)}\right)$$

This mathematical formula relies on the following notation:
i represents an iteration of the selecting;

$p_i(v)$ represents the per-unit flow cost of sender v during iteration i; and $\epsilon$ represents an optimality constraint.

According to this per-unit flow cost calculation, the flow cost for a node is based on the flow cost of the node in a prior iteration, the uploading data rate of the node for previously allocated data substreams of data streams, and the upload capacity of the node, in addition to the optimality constraint. An iterative process may utilize this per-unit flow cost calculation by selecting a low-cost routing tree 22 for an iteration and allocating the routing tree data rate of respective data streams 12 for the low-cost routing tree 22 based on residual upload capacities of the senders in the routing tree 22. After selecting a routing tree 22 for a particular data substream, the iterative process may calculate the residual upload capacities of the senders in the routing tree 22. The iteration may then be performed until the per-unit flow cost of the routing trees 22 is at least one, and no further data substreams of the data streams may be apportioned without exceeding the upload capacity of a node.

FIG. 10 presents an exemplary iterative process that applies the linear programming dual model for a multiple-data-stream, multiple-source communications session, illustrated as a pseudocode block 130 embodying this iterative process. This pseudocode block 130 may resemble the pseudocode block 60 of FIG. 4, but also takes into account the selection of multiple routing tree sets 20 for routing the data substreams of multiple data streams 12 by multiple sources 16. Moreover, the data rates of the routing trees 22 may be scaled by a scaling factor, L, to promote the selection of data rates that do not exceed the upload capacity of various senders. In this iterative process, the scaling factor L may also be adjusted by a counting of phases of selection over the set of data streams 12.

It may be appreciated that the variations of the techniques discussed with respect to a single-data-stream communications session may be similarly applied, alone or in combination, to multiple-data-stream communications sessions. For example, the several techniques for identifying low-cost routing trees 22 among the routing tree sets 20 may be similarly selected for multiple-data-stream communication sessions in view of the other network parameters (full or partial interconnectedness, upload connection caps, and the presence or absence of helpers), and may be similarly applied during various iterations. The improvements of such techniques may also be utilized, e.g., to remove leaf helpers 34 and to reallocate connections among the nodes of selected routing trees 22 to remove non-leaf helpers 32 and/or to reduce further the costs of the routing trees. Those of ordinary skill in the art may devise many embodiments and improvements of the application of such primal and linear programming dual models to multiple-data-stream communications sessions while implementing the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 11:
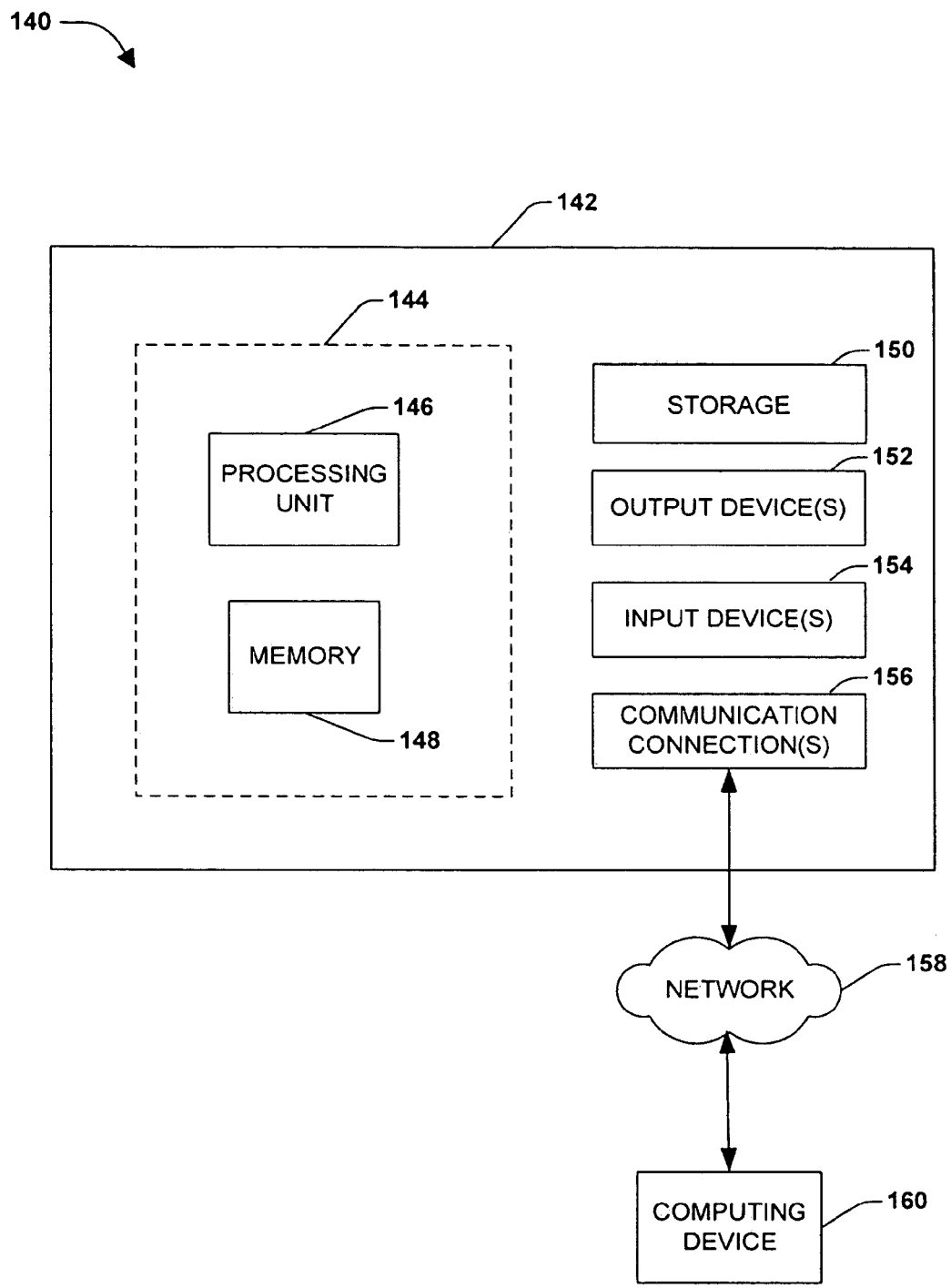
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 140 comprising a computing device 142 configured to implement one or more embodiments provided herein. In one configuration, computing device 142 includes at least one processing unit 146 and memory 148. Depending on the exact configuration and type of computing device, memory 148 may be volatile (such as RAM, for example), non-volatile (such as ROM, flash memory, etc., for example) or some combination of the two. This configuration is illustrated in FIG. 11 by dashed line 144.

In other embodiments, device 142 may include additional features and/or functionality. For example, device 142 may also include additional storage (e.g., removable and/or non-removable) including, but not limited to, magnetic storage, optical storage, and the like. Such additional storage is illustrated in FIG. 11 by storage 150. In one embodiment, computer readable instructions to implement one or more embodiments provided herein may be in storage 150. Storage 150 may also store other computer readable instructions to implement an operating system, an application program, and the like. Computer readable instructions may be loaded in memory 148 for execution by processing unit 146, for example.

The term "computer readable media" as used herein includes computer storage media. Computer storage media includes volatile and nonvolatile, removable and non-removable media implemented in any method or technology for storage of information such as computer readable instructions or other data. Memory 148 and storage 150 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 142. Any such computer storage media may be part of device 142.

Device 142 may also include communication connection(s) 156 that allows device 142 to communicate with other devices. Communication connection(s) 156 may include, but is not limited to, a modem, a Network Interface Card (NIC), an integrated network interface, a radio frequency transmitter/receiver, an infrared port, a USB connection, or other interfaces for connecting computing device 142 to other computing devices. Communication connection(s) 156 may include a wired connection or a wireless connection. Communication connection(s) 156 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 142 may include input device(s) 154 such as keyboard, mouse, pen, voice input device, touch input device, infrared cameras, video input devices, and/or any other input device. Output device(s) 152 such as one or more displays, speakers, printers, and/or any other output device may also be included in device 142. Input device(s) 154 and output device(s) 152 may be connected to device 142 via a wired connection, wireless connection, or any combination thereof. In one embodiment, an input device or an output device from another computing device may be used as input device(s) 154 or output device(s) 152 for computing device 142.

Components of computing device 142 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 142 may be interconnected by a network. For example, memory 148 may be comprised of multiple physical memory units located in different physical locations interconnected by a network.

Those skilled in the art will realize that storage devices utilized to store computer readable instructions may be distributed across a network. For example, a computing device 160 accessible via network 158 may store computer readable instructions to implement one or more embodiments provided herein. Computing device 142 may access computing device 160 and download a part or all of the computer readable instructions for execution. Alternatively, computing device 142 may download pieces of the computer readable instructions, as needed, or some instructions may be executed at computing device 142 and some at computing device 160.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of transmitting a data stream among a node set comprising a source of the data stream and a set of receivers over a routing tree set, respective routing trees specifying a route of the data stream among the source and the receivers, the method comprising:

representing the node set as a primal model allocating a routing tree data rate of the data stream for respective routing trees, the routing tree data rate within a capacity of respective nodes and within a capacity of respective connections between nodes in the route of the routing tree;

selecting routing tree data rates for respective routing trees that increase an aggregated data rate according to the primal model;

apportioning data substreams of the data stream for respective routing trees according to the routing tree data rate of the routing tree; and transmitting the data substreams over the respective routing trees at the respective routing tree data rates.

2. The method of claim 1, the primal model represented according to the mathematical formula:

$$\text{increase} \quad r = \sum_{t \in T} y_t$$

$$\text{subject to} \quad \sum_{t \in T} m_{v,t} y_t \leq C(v) \forall \ v \in V,$$

$$y_t \geq 0 \forall \ t \in T,$$

wherein:
V represents the set of receivers and the source;
v represents a sender in a routing tree;
C(v) represents the upload capacity of sender v;
T represents the routing tree set;
t represents a routing tree;
$y_t$ represents the routing tree data rate of routing tree t;
$m_{v,t}$ represents the number of receivers to which sender v transmits the data substream in routing tree t; and
r represents the aggregated data rate of the data stream transmitted over the routing trees.

3. The method of claim 1:
the primal model represented as a linear programming dual model associating a routing price with respective senders in the route of a routing tree, the routing price representing a per-unit flow cost of the data substream through the sender; and
the selecting comprising: selecting routing capacities that reduce the routing prices of the senders of the routing trees in the routing tree set.

4. The method of claim 3, the linear programming dual model represented according to the mathematical formula:

$$\text{reduce} \quad \sum_{v \in V} C(v) p_v$$

$$\text{subject to} \quad \sum_{v \in V} m_{v,t} p_v \geq 1 \forall \ t \in T,$$

$$p_v \geq 0 \forall_v \in V,$$

wherein:
V represents the set of receivers and the source;
v represents a sender in a routing tree;
C(v) represents the upload capacity of sender v;
T represents the routing tree set;
t represents a routing tree;
$m_{v,t}$ represents the number of receivers to which sender v transmits the data substream in routing tree t; and
$p_v$ represents the per-unit flow cost of sender v.

5. The method of claim 3:
the selecting comprising: iteratively selecting the routing capacities of the routing trees by:
selecting a low-cost routing tree for an iteration;
allocating the routing tree data rate for the low-cost routing tree based on residual capacities of the nodes and within a capacity of respective connections between nodes in the routing tree; and
calculating the residual capacities of the nodes and connections between nodes in the routing tree,
until the per-unit flow cost of the routing trees is at least one; and
the per-unit flow cost of sender v calculated according to the mathematical formula:

$$p_i(v) = p_{i-1}(v)\left(1 + \varepsilon \frac{m_{v,t_i} y_i}{C(v)}\right)$$

wherein:
i represents an iteration of the selecting;
$p_i(v)$ represents the per-unit flow cost of sender v during iteration i; and
$\varepsilon$ represents an optimality constraint.

6. The method of claim 5, the per-unit flow cost of sender v during a first iteration calculated according to the mathematical formula:

$$p_0(v) = (1+\varepsilon)((1+\varepsilon)\mathcal{L})^{\frac{-1}{\varepsilon}}$$

wherein $\mathcal{L}$ represents a scaling factor computed according to the mathematical formula:

$$\mathcal{L} = \max_{v \in V} \frac{U(v)}{C(v)}$$

wherein U(v) represents an aggregate upload rate of sender v among all routing trees.

7. The method of claim 5:
the node set comprising at least zero helpers;
the source, receivers, and helpers capable of sending to the respective receivers and respective helpers without an upload connections cap;
the routing price calculated as an effective routing price according to the mathematical formula:

$$\hat{p}(v) = \begin{cases} p(v) & \text{if } v \in s \cup R \\ p(v)\frac{|R|}{|R|-1} & \text{if } v \in H \end{cases}$$

wherein:
$\hat{p}(v)$ represents the effective routing price,
s represents the source,
R represents the set of receivers, and
H represents the set of helpers; and
selecting the low-cost routing tree comprising:
selecting a sender v having a low effective routing price among the senders of the node set;
if v is the source, generating a routing tree routing a data substream from the source to the receivers;
if v is a receiver, generating a routing tree routing a data substream from the source to v and from v to the receivers except v; and
if v if a helper, generating a routing tree routing a data substream from the source to v and from v to the receivers.

8. The method of claim 5:
the source and receivers capable of sending to the respective receivers and respective helpers with an upload connections cap of upload connections; and
selecting the low-cost routing tree comprising:
selecting a sender v having a low routing price among the senders of the node set;
generating a routing tree routing a data substream from the source to v; and recursively extending the routing tree from senders to receivers by:
  selecting a sender v having a low routing price among the receivers included in the routing tree and having at least one fewer upload connection as compared with the upload connections cap;
  selecting a receiver $v_a$ having a low routing price among the receivers not yet included in the routing tree; and
  extending the routing tree to route the data substream from v to receiver $v_a$,
until the routing tree includes the set of receivers.

9. The method of claim 5:
the node set comprising at least zero helpers;
the source, receivers, and helpers capable of sending to the respective receivers and respective helpers with an upload connections cap of upload connections; and
selecting the low-cost routing tree comprising:
  selecting a sender v having a low routing price among the senders and helpers of the node set;
  generating a routing tree routing a data substream from the source to v; and
  recursively extending the routing tree by:
    selecting a sender $v_a$ having a low routing price among the senders included in the routing tree and having at least one fewer upload connection as compared with the upload connections cap, and
    extending the routing tree to route the data substream from $v_a$ to respective low-priced nodes not yet included in the routing tree until the upload connections of $v_a$ equal the upload connections cap,
until the routing tree includes the set of receivers.

10. The method of claim 9, the selecting comprising: after selecting the low-cost routing tree, removing at least one leaf helper by:
identifying a leaf helper in the routing tree;
selecting a high-cost node having at least one upload connection;
removing the leaf helper from the routing tree;
transferring an upload connection from the high-cost node to the sender of the leaf helper in the routing tree; and
if the high-cost node is a helper:
  identifying at least one low-cost node having at least one fewer upload connection as compared with the upload connections cap;
  transferring the receivers of the high-cost node to the at least one low-cost node; and
  removing the high-cost node from the routing tree.

11. The method of claim 5:
the node set comprising at least zero helpers;
the source, receivers, and helpers capable of sending to a neighbor set of respective receivers and respective helpers; and
selecting the low-cost routing tree comprising:
  selecting a sender v having a low routing price among the senders and helpers of the node set;
  generating a routing tree routing a data substream from the source to v; and
  recursively extending the routing tree by:
    selecting a sender $v_a$ having a low routing price among the receivers included in the routing tree, and
    extending the routing tree to route the data substream from $v_a$ to nodes in the neighbor set of $v_a$ that are not yet included in the routing tree,
until the routing tree includes the set of receivers.

12. The method of claim 11, the selecting comprising:
after selecting the low-cost routing tree, removing leaf helpers; and
after selecting the low-cost routing tree:
  for respective non-leaf helpers:
    upon identifying that the upload connections of the non-leaf helper have at least one neighbor node other than the non-leaf helper:
      upon identifying that a respective upload connection of the non-leaf helper node has a neighbor node with a lower routing cost than the non-leaf helper, transferring the upload connection to an upload connection of the neighbor node; and
      upon removing the upload connections of the non-leaf helper, removing the non-leaf helper from the routing tree.

13. A method of transmitting at least two data streams among a node set comprising at least two sources of the respective data streams and a set of receivers over a routing tree set, respective routing trees specifying a route of the data stream among a respective source and the receivers, the method comprising:
representing the node set as a primal model allocating a routing tree data rate of respective data streams for respective routing trees, the routing tree data rate within a capacity of respective nodes and connections between nodes in the route of the routing tree;
selecting routing tree data rates for respective routing trees that increase an aggregated data rate according to the primal model;
apportioning data substreams of the respective data streams for respective routing trees according to the routing tree data rate of the routing tree; and
transmitting the data substreams of the respective data streams over the respective routing trees at the respective routing tree data rates.

14. The method of claim 13, the primal model represented according to the mathematical formula:

$$\text{increase} \quad \lambda$$
$$\text{subject to} \quad \sum_{t \in T^k} y_t = \lambda T^k \, \forall \, k = 1, 2, \ldots, K$$
$$\sum_k \sum_{t \in T^k} m_{v,t} y_t \le C(v), \, \forall \, v \in V$$
$$y_t \ge 0, \, \forall \, t \in T^k, \, \forall \, k = 1, 2, \ldots, K$$

wherein:
V represents the set of receivers and the source;
v represents a sender in a routing tree;
k represents a data stream;
K represents the set of data streams;
$T^k$ represents the routing tree set for data stream k;
t represents a routing tree;
$y_t$ represents the routing tree data rate of routing tree t;
λ represents a data stream rate multiplier;
$r^k$ represents the data rate of data stream k;
$m_{v,t}$ represents the number of receivers to which sender v transmits the data substream in routing tree t; and
C(v) represents the upload capacity of sender v.

15. The method of claim 13:
the primal model represented as a linear programming dual model associating a routing price with respective senders in the route of a routing tree of a data stream, the routing price representing a per-unit flow cost of the data substream through the sender; and the selecting comprising: selecting routing capacities that reduce the routing prices of the senders of the routing trees of respective data streams in the routing tree set.

16. The method of claim 15, the linear programming dual model represented according to the mathematical formula:

$$\text{reduce} \quad \sum_{v \in V} C(v) p_v$$

$$\text{subject to} \quad \sum_{v \in V} m_{v,t} p_v \geq z_k \, \forall \, t \in T_k, \, \forall \, k = 1, 2, \ldots, K,$$

$$\sum_{k=1}^{K} r^k z_k \geq 1$$

$$p_v \geq 0 \, \forall_v \in V,$$

wherein:
V represents a set of receivers and a source of a respective data stream;
v represents a sender in a routing tree;
$C(v)$ represents the upload capacity of sender v;
$p_v$ represents the per-unit flow cost of sender v; and
k represents a data stream from a source;
$r^k$ represents the data rate of data stream k;
$z_k$ represents a data stream constraint of data stream k;
$T_k$ represents the routing tree set for data stream k; and
$m_{v,t}$ represents the number of receivers to which sender v transmits the data substream in routing tree t.

17. The method of claim 15, the selecting comprising: iteratively selecting the routing capacities of the routing trees by:
selecting a low-cost routing tree for an iteration;
allocating the routing tree data rate of respective data streams for the low-cost routing tree based on residual capacities of the nodes and residual capacities of connections between nodes and residual capacities of connections between nodes in the routing tree; and
calculating the residual capacities of the nodes and residual capacities of connections between nodes in the routing tree, until the per-unit flow cost of the routing trees is at least one; and
the per-unit flow cost of sender v calculated according to the mathematical formula:

$$p_i(v) = p_{i-1}(v) \left(1 + \varepsilon \frac{m_{v,t_i} y_i}{C(v)}\right)$$

wherein:
i represents an iteration of the selecting;
$p_i(v)$ represents the per-unit flow cost of sender v during iteration i; and
$\varepsilon$ represents an optimality constraint.

18. The method of claim 16:
the node set comprising at least zero helpers;
the source, receivers, and helpers capable of sending to the respective receivers and respective helpers without an upload connections cap;
the routing price calculated as an effective routing price according to the mathematical formula:

$$\hat{p}(v) = \begin{cases} p(v) & \text{if } v \in s \cup R \\ p(v) \frac{|R|}{|R|-1} & \text{if } v \in H \end{cases}$$

wherein:
$\hat{p}(v)$ represents the effective routing price,
s represents the source,
R represents the set of receivers, and
H represents the set of helpers; and
selecting the low-cost routing tree comprising:
selecting a sender v having a low effective routing price among the senders of the node set;
if v is the source, generating a routing tree routing a data substream from the source to the receivers;
if v is a receiver, generating a routing tree routing a data substream from the source to v and from v to the receivers except v; and
if v if a helper, generating a routing tree routing a data substream from the source to v and from v to the receivers.

19. The method of claim 16:
the source and receivers capable of sending to the respective receivers and respective helpers with an upload connections cap of upload connections; and
selecting the low-cost routing tree comprising:
selecting a sender v having a low routing price among the senders of the node set;
generating a routing tree routing a data substream from the source to v; and
recursively extending the routing tree from predecessor sender v to the receivers by:
selecting a receiver $v_a$ having a low routing price among the receivers not yet included in the routing tree and having at least one fewer upload connection as compared with the upload connections cap;
extending the routing tree to route the data substream from v to receiver $v_a$; and
selecting $v_a$ as predecessor sender v,
until the routing tree includes the set of receivers.

20. A method of transmitting a data stream among a node set comprising a source of the data stream and a set of receivers over a routing tree set, respective routing trees specifying a route of the data stream among the source and the receivers, the method comprising:
representing the routing tree set as a primal model allocating a routing tree data rate of the data stream for respective routing trees, the routing tree data rate within a capacity of respective nodes and within a capacity of respective connections between nodes in the route of the routing tree, and the primal model represented as a linear programming dual model associating a routing price with respective senders in the route of a routing tree, the routing price representing a per-unit flow cost of the data substream through the sender, according to the mathematical formula:

$$\text{reduce} \quad \sum_{v \in V} C(v) p_v$$

$$\text{subject to} \quad \sum_{v \in V} m_{v,t} p_v \geq 1 \, \forall \, t \in T,$$

$$p_v \geq 0 \, \forall_v \in V,$$

wherein:
V represents the set of receivers and the source;
v represents a sender in a routing tree;
C(v) represents the upload capacity of sender v;
T represents the routing tree set;
t represents a routing tree;
$m_{v,t}$ represents the number of receivers to which sender v transmits the data substream in routing tree t; and
$p_v$ represents the per-unit flow cost of sender v;
iteratively selecting routing tree data rates for respective routing trees that reduce the routing prices of the senders of the routing trees in the routing tree set by:
  selecting a low-cost routing tree for an iteration;
  allocating the routing tree data rate for the low-cost routing tree based on residual capacities of nodes and on residual capacities of connections between nodes in the routing tree; and
  calculating the residual capacities of the nodes and the residual capacities of connections between nodes in the routing tree, until the per-unit flow cost of the routing trees is at least one; and
the per-unit flow cost of sender v calculated according to the mathematical formula:

$$p_i(v) = p_{i-1}(v)\left(1 + \varepsilon \frac{m_{v,t_i} y_i}{C(v)}\right)$$

wherein:
i represents an iteration of the selecting;
$p_i(v)$ represents the per-unit flow cost of sender v during iteration i;
$\varepsilon$ represents an optimality constraint;
the per-unit flow cost of sender v during a first iteration calculated according to the mathematical formula:

$$p_0(v) = (1+\varepsilon)((1+\varepsilon)\mathcal{L})^{\frac{-1}{\varepsilon}}$$

wherein $\mathcal{L}$ represents a scaling factor computed according to the mathematical formula:

$$\mathcal{L} = \max_{v \in V} \frac{U(v)}{C(v)}$$

wherein U(v) represents an aggregate upload rate of sender v among all routing trees;
apportioning data substreams of the data stream for respective routing trees according to the routing tree data rate of the routing tree; and
transmitting the data substreams over the respective routing trees at the respective routing tree data rates.

* * * * *